United States Patent [19]

Coleman

[11] Patent Number: 5,784,172
[45] Date of Patent: Jul. 21, 1998

[54] AUTOMATIC ALGORITHMIC DETERMINATION OF PROCESS BLACK OVER A COLOR FIELD

[75] Inventor: Robert M. Coleman, Altadena, Calif.

[73] Assignee: Xerox Corporation, Stamford, Conn.

[21] Appl. No.: 653,182

[22] Filed: May 24, 1996

[51] Int. Cl.⁶ .............. H04N 1/40; H04N 1/46; G03F 3/08; G06F 15/00
[52] U.S. Cl. .............. 358/298; 358/518; 358/530; 395/116
[58] Field of Search ............... 358/296, 298, 358/515, 518, 529, 530; 395/101, 109, 116, 131; 382/312, 319

[56] References Cited

U.S. PATENT DOCUMENTS

| | | | |
|---|---|---|---|
| 4,500,919 | 2/1985 | Schreiber | 358/518 |
| 5,231,504 | 7/1993 | Magee | 358/520 |
| 5,588,093 | 12/1996 | Harrington | 395/109 |
| 5,650,942 | 7/1997 | Granger | 358/520 X |

*Primary Examiner*—Eric Frahm
*Attorney, Agent, or Firm*—Robert Cunha

[57] ABSTRACT

A digital color printing method and system is described which automatically determines a mixture of colorants to compose a process black color, taking into account relevent printing characteristics of a color printer and the background color at the point on the page at which the process black is to be printed. In certain printing systems, printing problems can occur when process black, composed of a mixture of colorants such as cyan, magenta, yellow, and black, is printed over a color background. For example, in a xerographic color printing system, a process black containing all colorants at maximum or near-maximum value can sometimes produce objectionable deletions in a surrounding color field, caused by interference in the transfer of toner to the background color field due to the process black toner pile height. Excessive combined toner pile height can also create an unevenness in the final print. Similarly, ink jet color printing systems can experience smearing and spreading due to excessive ink coverage when printing four-color process blacks. A system is described which automatically detects objects commanded to be printed as process black and recalculates the composition of the process black based on both the background color at the current position on the page and a predetermined set of tolerances for a particular printer.

26 Claims, 7 Drawing Sheets

AUTOMATIC ALGORITHMIC DETERMINATION OF PROCESS BLACK OVER A COLOR FIELD

BACKGROUND OF THE INVENTION

1. Field of the Invention

The present invention relates to digital color printing in which black objects and color objects are intermixedly printed, and more particularly, in which the composition of colorants comprising each process black object may be automatically calculated depending on both printer characteristics and background color.

2. Description of the Related Art

Digital color printers use a plurality of colorants, such as cyan, magenta, yellow, and black, to form images which appear to the human visual system to contain a multitude of colors. In particular, the color black may be formed in a number of ways. First, it may be formed of equal or nearly equal combinations of cyan, magenta, and yellow. In practice, the black colorant is also often added to the combination of cyan, magenta, and yellow colorants to increase the maximum density and avoid problems of unwanted color. When black is formed with a mixture of some of cyan, magenta, yellow, and black, it is a type of black color known as process black. Alternatively, the color black may be formed with black colorant only. In this case, it is known as single-color black.

Process black is often used in contexts in the printing process in which a high-coverage, high-density, glossy black is needed. It is often used for example when a black object is to be printed over a color background. There are several benefits to using process black in this situation instead of single-color black. First, the gloss of a process black object in general corresponds better with the gloss of the surrounding color field. Second, on certain dense color backgrounds process black is used so that its density will better correspond to the density in the background color. Third, the ink coverage or toner pile height of process black may better match that of the surrounding color background. Finally, the presence of misregistration between the plurality of separations during the printing process, or the presence of other interactions between the separations, can result in objectionable white or light-colored fringing around a single-color black object on a color background, but a process black object can avoid this problem.

However, process black can also cause problems if the same formulation of process black is used against a variety of color backgrounds. For example, a dense process black with a large amount of colorant, which might be suitable for printing over a dense or dark color background, when printed on a light colored background can create pile height or ink coverage differences between the black object and its light colored background. This can result in printing defects such as tactile unevenness or toner deletion in the background color surrounding the black object. A process black with smaller values of C, M, Y may be better suited for light backgrounds, but can show problems of "caving" if its total pile height is less than the height of the surrounding background for darker backgrounds. Further, if the C, M, Y content of a process black is significantly less than that of the color background, the chances for showing light fringes around the process black object due to misregistration is increased.

Thus, it is often not possible to specify a single process black formulation for a given printing system which is both dense enough to provide good contrast and pile height or ink coverage when printed over dark colors while having little enough toner pile height to avoid xerographic or other printer defects when the background color is light.

No automatic system exists for adjusting the process black formulation based on background color and printer characteristics. The general approach in the art is to pick a "compromise" formulation of process black which may be adequate for most printing systems and most background colors. In pages where complex black objects may be placed over a color background which changes rapidly, or pages which have widely differing color backgrounds, or on printing systems which are particularly sensitive to toner pile height problems or ink coverage problems, problems associated with using a single formulation of process black become evident. Furthermore, many pages not designed by a knowledgeable graphic artist can benefit from a method and apparatus to automatically adjust the process black formulation depending on printer characteristics and background color.

This invention teaches a method in which the optimum colorant composition is calculated for each process black object, taking into consideration both the limitations of a particular printing system and the background color at the position on the page at which a process black object is being printed.

In conjunction with patent application "Color Printing Yielding a Background Dependent Color Image", Ser. No. 08 579,386, this invention may also be used to control the composition of process black when the previously described invention changes a single-color black object to a process black object. As described in that patent application, process black objects printed on top of a color field generally exhibit a greater density and gloss and show fewer problems caused by the misregistration of separations or other printer defects, such as white fringes around the black objects. However, these same process black objects, if the process black is uncontrolled, can in certain printing systems create new problems due to excess ink or toner, or, alternatively, insufficient coverage, unless the methods of this invention are applied.

OBJECTS AND SUMMARY OF THE INVENTION

One object of the present invention is to provide a method which changes the formulation of process black to print when such a change would change the toner pile height or ink coverage of the black color to better correspond to the pile height or ink coverage of a color background.

Another object of the present invention is to provide a method which changes the formulation of process black to print when such a change would decrease the objectionable printing defects caused by misregistration or interactions of the black color with a color background.

Another object of the present invention is to provide a method which changes the formulation of process black to print when such a change would bring the printing of the process black into conformance with predetermined limitations of a printing process.

To achieve the foregoing and other objects and to overcome the shortcomings discussed above, a digital color printing method and system is provided which automatically detects when a process black object is commanded to be printed, and changes the formulation of the process black color depending on both the composition of the background color at the position on the page at which the black object is commanded to be printed and the known printing parameters which reduce printing defects. As objects are commanded to be printed, a detection operation detects if the objects are commanded to be printed in a process black color. If so, a background determining operation is performed to determine a color which has previously been commanded to be printed at the location at which the process black object is commanded to be printed. A color changing step is then performed in which the composition of the background color and pre-determined printer characteristics may be used to change the composition of the process black in order to enhance the print quality and reduce visible printing defects.

BRIEF DESCRIPTION OF THE DRAWINGS

The invention will be described in detail in reference to the following drawings in which like reference numerals refer to like elements and wherein.

DETAILED DESCRIPTION OF THE PREFERRED EMBODIMENTS

Figure 1:
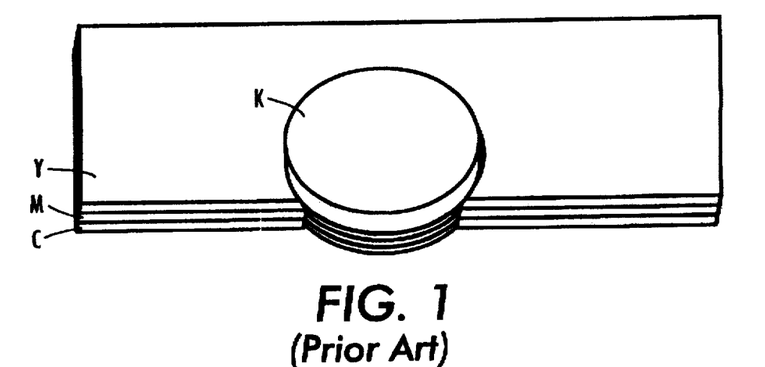
FIG. 1 shows an output in the prior art in which a fixed process black with low levels of non-black colorants is printed on a color background which also has low levels of colorant.

Referring now to the drawings, and particularly to FIG. 1 thereof, a fixed process black object, containing small amounts of cyan, magenta, and yellow (C, M, Y) toners is shown being imaged on top of a color background which also contains small or thin toner layers. In this case, few problems are seen in the quality of the prior art print.

Figure 2:
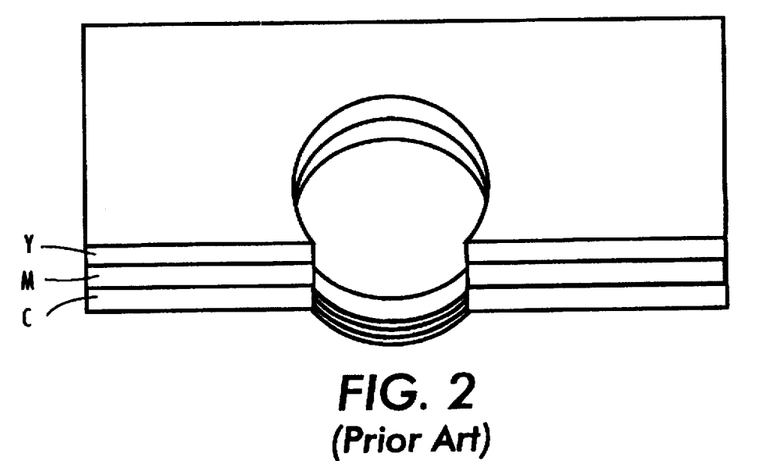
FIG. 2 shows an output in the prior art in which the same fixed process black of FIG. 1 is now printed on a color background which has high levels of colorant.

However, as shown in FIG. 2, if the same fixed formulation of process black, containing small amounts of C, M, and Y, is now printed on top of a background color containing thick layers of C, M, Y toners, it is possible in the prior art for the fixed composition of process black to have an inadequate coverage level (toner height, in the example shown) compared to the densely colored background. In this case, "caving" may occur in which the process black object is noticeably and objectionably lower than the surrounding background color.

Figure 3:
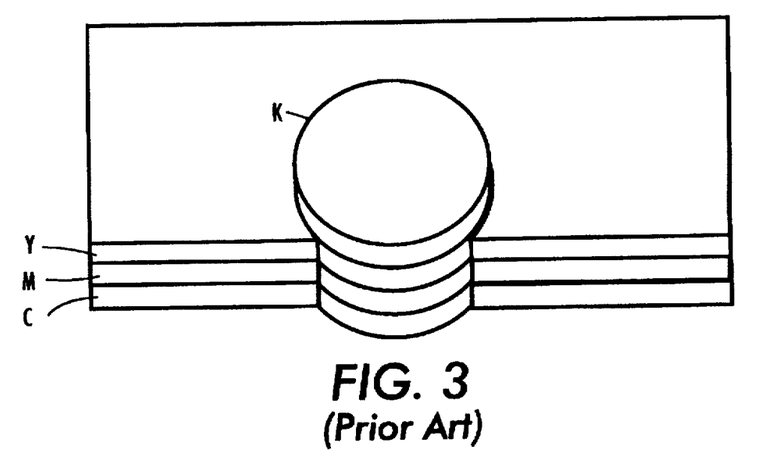
FIG. 3 shows an output in the prior art in which a fixed process black with high levels of non-black colorants is printed on a color background which also has high levels of colorant.
Figure 4:
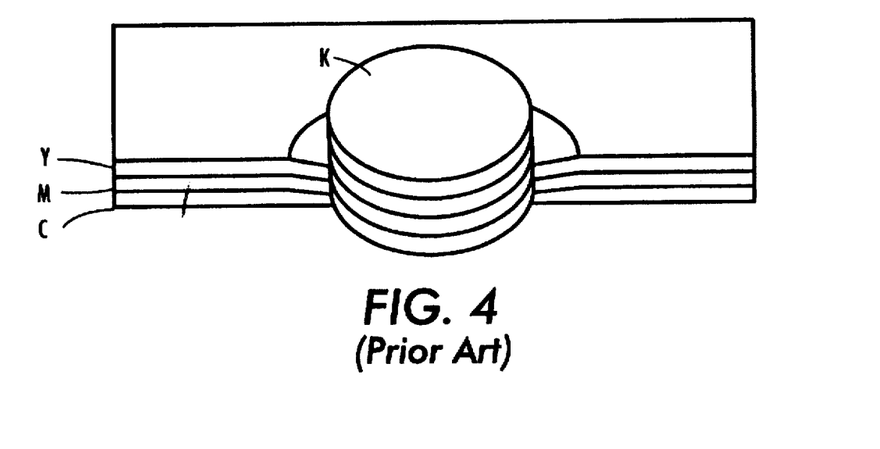
FIG. 4 shows an output in the prior art in which the same fixed process black of FIG. 3 is now printed on a color background which has low levels of colorant.

The opposite problem is shown in FIGS. 3 and 4. In FIG. 3, a fixed process black is chosen which contains high amounts of cyan, magenta, and yellow toners and is imaged on top of a color background which also contains high amounts of C, M, Y toner. In this case, few problems are seen in the quality of the prior art print.

However, as shown in FIG. 4, if the same formulation of process black, containing high amounts of C, M, and Y, is now printed on top of a background color containing thin layers of C, M, Y toners, it is possible in the prior art for the fixed composition of process black to have an unaccceptable toner height difference with the lightly colored background. In this case, not only will the height difference be noticeable, but in some printing systems the excess toner height will also cause additional deletions in the color background surrounding the process black object, resulting in objectionable light colored fringes around the black object.

Figure 5:
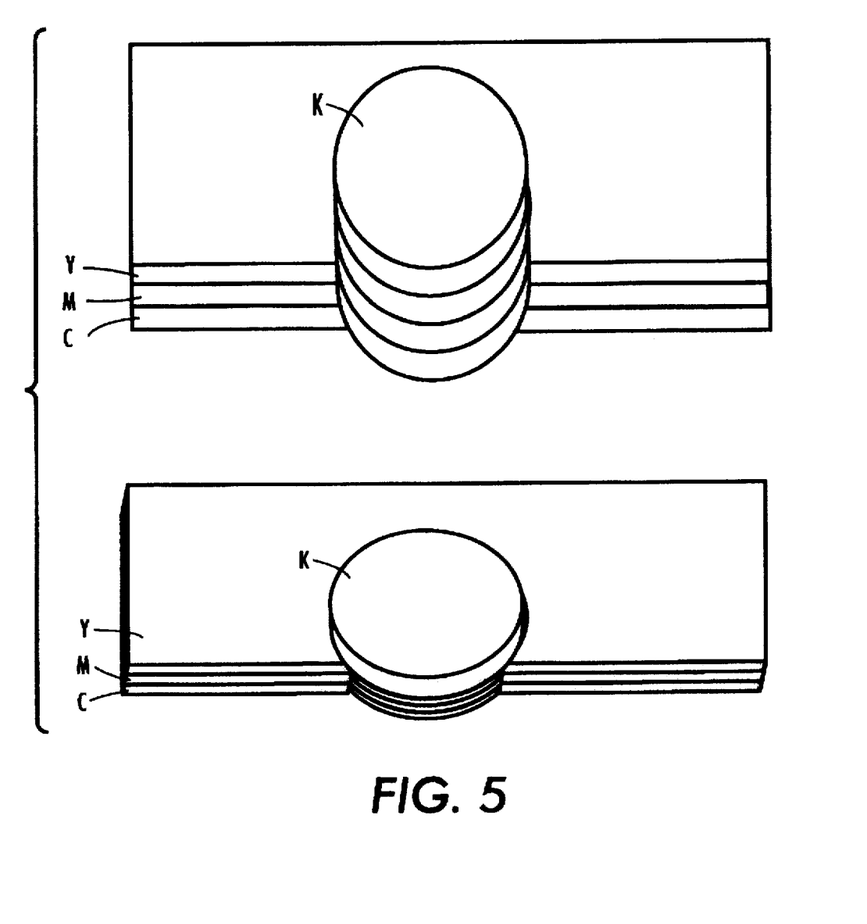
FIG. 5 shows variable process blacks produced by the method and system of this invention in which the colorant levels used depend in part on the background color.

FIG. 5 shows how the current invention solves the problems shown in FIGS. 1–4 and other problems not shown which can occur when a fixed formulation of process black is used for all color backgrounds. Instead of using a fixed formulation of process black, the current invention calculates the amount of non-black toners to use in the process black whenever a process black object is encountered. The calculations may be based on both background color and printer parameters which may specify, for example, maximum toner height allowed for quality printing, maximum difference between background and foreground toner heights, etc. The parameters which are important vary with each printing system. Thus, as shown in FIG. 5, on a background containing high levels of toner, a process black may be printed which also contains high levels of non-black toner. Similarly, on a background which has low toner levels, a different process black may be printed which also has low levels of non-black toners. In this way, printing problems due to severe differences in colorant coverage are eliminated, but the advantages of using process black over a color field is still retained.

Figure 6:
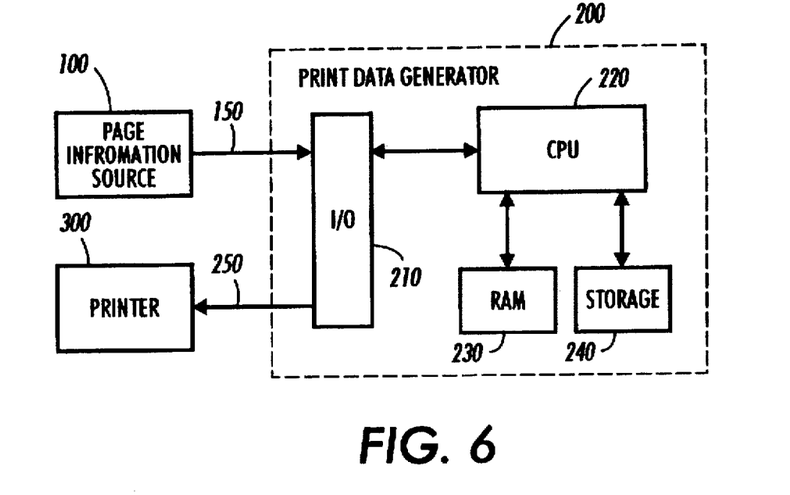
FIG. 6 is a block diagram of an apparatus made according to and for practicing the method of the invention, in which the changes to the composition of process black objects take place within the print data generator.

Referring now to FIG. 6, a generalized page printing system made according to the present invention is shown. It includes a page information source 100 connected via communication link 150 to a print data generator 200. Generator 200 is connected to a printer 300 via a communication link 250. Generator 200 includes an I/O controller 210, a CPU (central processing unit) 220, a RAM 230 which can store program and data information, and a storage apparatus 240 for non-volatile storage. These devices 210–240 may be any of a number of conventional devices generally available. Other hardware that accomplish the same functions can be used. As will be seen, various embodiments are realizable from this general structure.

Typically, page information source 100 may be a conventional work station or other computer system such as an IBM PC or Apple Macintosh. Communication link 150 may be a part of a computer network or a dedicated link. Print data generator 200 is usually a dedicated computer attached to a printer 300 such as one of many electromechanical devices responsive to raster data for producing a printed page. Many other configurations are possible. For example, generator 200, programmed to function as described herein, could also be incorporated together in the same computer running the page source 100 software. In this case of shared computer hardware and separate software, the functions of page information source 100 and print data generator 200 remain distinct. The methods as described herein remain applicable through a wide range of apparatus configurations.

FIG. 6 shows an embodiment in which the print data generator 200 is programmed to carry out the methods described herein and shown in FIGS. 8–11. In this case, a page representation is received from conventional page source 100. The page representation may be a conventional page description language such as the language available from Adobe Systems Incorporated known as PostScript, or an equivalent. In the page representation received from the page source 100, objects such as text, graphics, or pictures can be created and placed on the page in arbitrary order. The objects are defined by descriptive commands, some of which control the location, shape, orientation, and size of an object. At least one command controls the color of an object. An object's color may include neutral colors such as black and grey. Objects may overlap each other, and a priority method determines which objects are on top of other objects.

As further discussed herein, when a page representation is received from a conventional page source 100 by print data generator 200 and generator 200 is programmed to carry out the method of this invention, generator 200 may in certain situations modify the output commanded by the page representation. As described herein, generator 200 may change the formulation of a process black object contrary to the command of the page representation before merging it into the generated print data. Thus, the page as sent by a conventional page information source 100 will be printed differently than specified, in order to accomplish the objectives of this invention for improving print quality. The advantage of this configuration is that page representations received from any number and variety of conventional page sources 100 may be automatically modified by generator 200 to print with higher quality.

Figure 7:
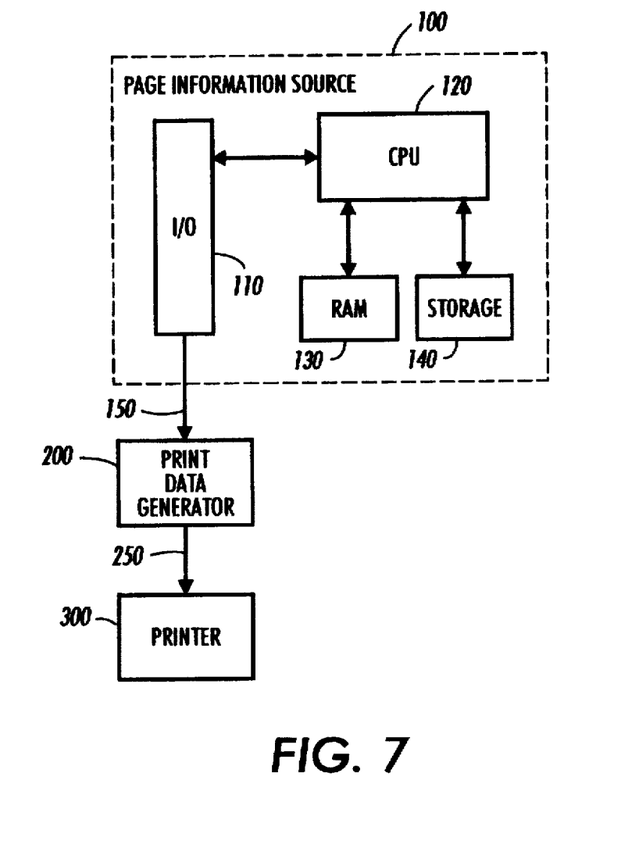
FIG. 7 is a block diagram of an apparatus made according to and for practicing the method of the invention, in which the changes to the composition of process black objects take place within the page information source.

In FIG. 7, a different apparatus and configuration is shown. In this case, the page information source 100 includes resources such as I/O controller 110, CPU 120, RAM 130, and storage 140 which allow page source 100 to be programmed to carry out the methods of the invention described herein. In this apparatus, before a page representation is sent via communication link 150 to a conventional print data generator 200, the methods of this invention are applied in order to produce a page representation which achieves the objectives of this invention by reformulating the process black objects in the image. In this configuration, the print data generator 200 may be conventional and the page information source 100 is programmed according to the methods of this invention. The advantage of this configuration of apparatus is that the page representation, which has been modified according to this invention to automatically determine a process black formula, will be printed with higher quality by any conventional print data generator 200 and printer 300.

Figure 8:
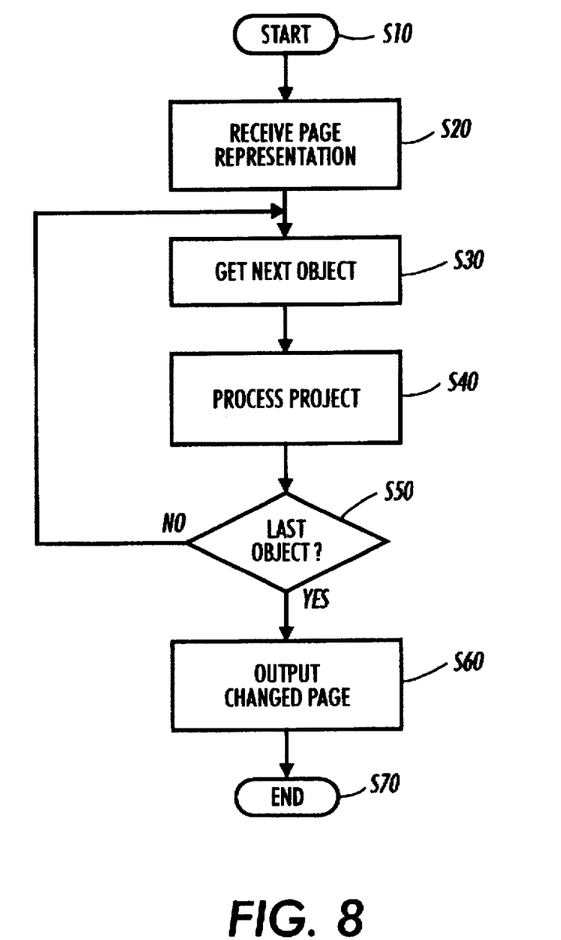
FIG. 8 shows a flowchart for an overall process in which a document is processed object by object.

FIG. 8 illustrates a generalized flow diagram of a process or method according to the invention by which a background dependent process black image is formed. After starting in step S10, in step S20 a page representation is received. This page representation represents a collection of colored objects in a data format such as a conventional page description language or equivalent data format as previously described.

In step S30, the next object which has not yet been processed is retrieved from the page representation. This retrieved object is further processed in step S40 as will later be described in greater detail. In step S50, it is determined if this is the last object to be retrieved from the page description language. If it is not the last object, then control returns to step S30 where the next object is retrieved. Otherwise, if this is the last object defined by the page description language, control flows to step S60 where the document, which has possibly been changed during the object processing step S40, is output.

The form of the outputted changed document of step S60 depends on where the changes according to the methods of this invention have been made. For example, in the apparatus as described in FIG. 8, in which the methods of this invention are implemented within the page information source 100, the outputted changed document can be in the form of a modified page description language or equivalent internal data structure which commands a background dependent process black image. This page description language would, if sent to a conventional printing system, print an image whose process black composition is dependent on the background color in accordance with the objects of this invention. In this case, the modifications would take the form of substituting existing process black color commands for new process black color commands which command new formulations of process black.

Alternatively, as for example in the apparatus as described in FIG. 6, in which the methods of this invention are implemented within the print data generator 200, the output step of step S60 can be in the form of a printable page data structure such as a set of bitmaps, pixel maps, or other intermediate data structure which is in a form acceptable for use by a raster color printer. In this case, the output step S60 involves outputting the modified print data to a network, a printer or a storage device. The output step S60 could also be a hybrid output consisting for example of a page description language which incorporates a printable data structure such as a byte map. For the purposes of this invention, the output for the changed document could assume any number of equivalent forms. Finally, control flows to step S70, where the process ends.

Figure 9:
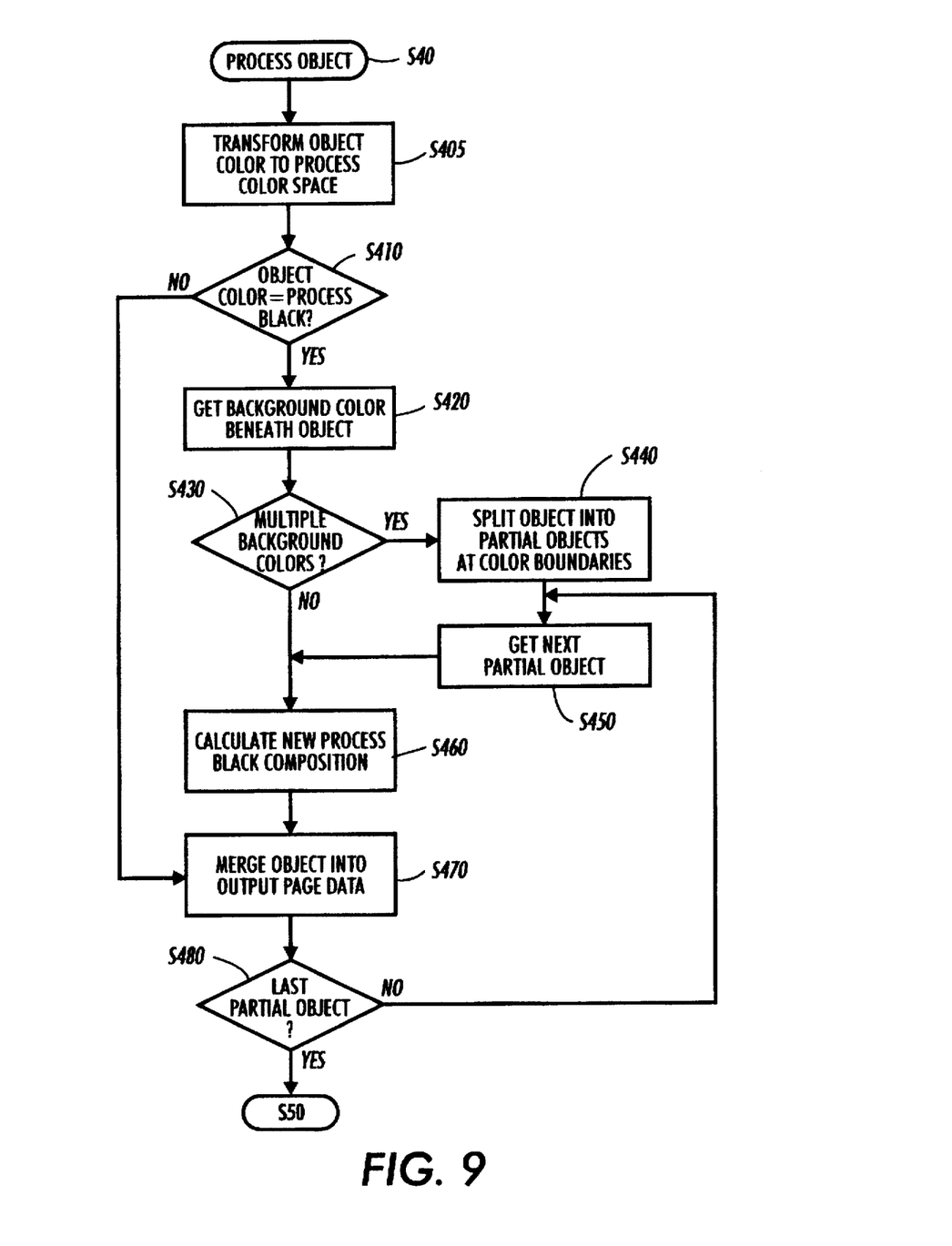
FIG. 9 shows the method by which each object is processed and merged into the output data.

FIG. 9 shows in greater detail the step S40 of processing an object. In step S405, the color of the object to be processed is transformed. Although page description languages often allow the color of an object to be be expressed in many different color spaces or systems such as calibrated RGB or L*a*b*, the concept of "process black" only has meaning once the object color has been transformed to the color set used by the printing process. This color space is called the process space, most generally CMYK (cyan, magenta, yellow, black). It is only after transforming the color space to CMYK that it can be known whether a black object is specified to be printed in pure black or with a mixture of black and process colors.

After the color transformation of step S405, it is possible to determine, in step S410, whether or not the color is process black. In CMYK space, process black may be constructed in a number of ways, all of which may be efficiently identified. For example, C=M=Y=1, or C=M=Y and K=1, or K=1 and C, M, and/or Y are non-zero all may be valid definitions of process black for most printing systems.

If in step S410 the object color is not process black, control flows immediately to step S470, in which the object is merged into the output page data. This output page data can take many forms depending on the particular printing system within which this invention is embodied. The output page data, at each moment, represents the collection of objects already processed whose color need not be further modified by the method of this invention, collectively represented in an intermediate form which is preparatory to the already described document outputting step of step S60. For example, the output page data could be in the form of a pixel map containing a raster of color data for each pixel on the page to be printed, or an intermediate form such as a display list describing the ordered list of colored objects for each scan line in the final page. The merging of an object into such an output page data is a conventional step which involves adding the object to the intermediate form output page data in such a way that it will be printed in the correct location, with the correct shape, with the correct relation to other objects on the page, and with the correct color.

Returning to step S410, if the object color is found to be process black, the processing proceeds to step S420 where the background color which is beneath the object is obtained. If the output page data referred to in step S470 consists of a pixel map, ie. a raster of pixels for each printable location on the page, then the step of getting the background color beneath the object consists of reading the set of pixels found within the shape defined by the black object currently being considered. If the output page data consists instead of a display list such as a list of objects per scan line, ordered by position on each scan line and with information controlling the positional layer of each object, then the step of obtaining the background color consists of finding the object or objects already processed whose position along the scan line determines that they would be beneath the currently considered black object, and obtaining the color of said objects. If the object consists of shape information such as a bitmap which defines the on and off portions of the image, and color information which assigns a color to the on bits (foreground) and off bits (background) of the object, then the background color is determined by examining the color associated with the off bits of the shape-defining bitmap.

Figure 10:
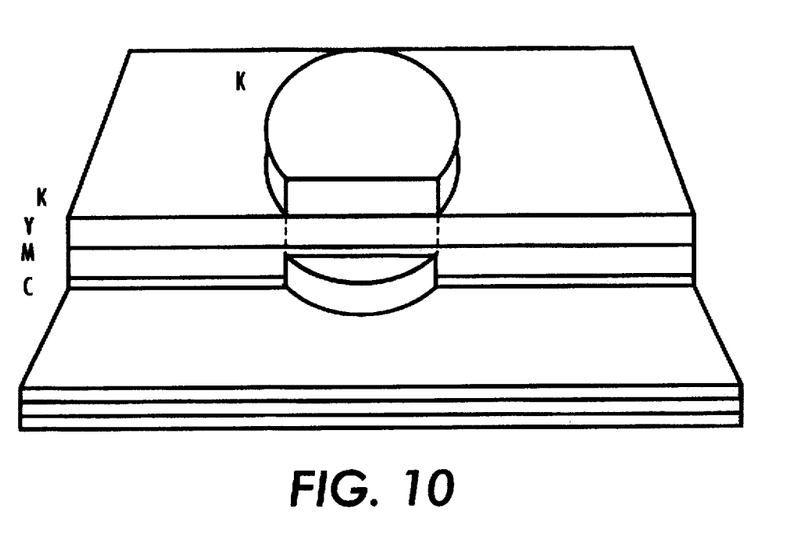
FIG. 10 illustrates an output in which a process black object is printed over a boundary in which the background color changes and is thereby printed as multiple partial objects, with each partial object having a different composition of process black.

In any of the above cases, if an object is found to have two or more background colors within its shape, the control may flow to step S440, where the object is split into multiple objects whose edge boundaries follow the edge boundaries of the multiple background colors. The result of this splitting step is that each object or partial object contains one background color which may be analyzed to determine the composition of process black to use. Thus as shown in FIG. 10, the composition of process black for an object which extends over the boundary of a color field may be made to change within the boundaries of the object at the edge of the color background beneath the object. The partial object which is over the dense color field may be imaged using one formulation of process black, while the partial object which is over the thin color field may be imaged using a different formulation of process black with different amounts of C, M, and Y.

Returning to FIG. 9, from step S440 control flows to step S450, where the next partial object from the list of partial objects generated in splitting step S440 is chosen for further processing.

It will be appreciated that if it is determined that the splitting step S440 is not efficient to perform and it is preferable to treat objects as whole objects regardless of transitions of background color beneath an object, said steps S430, S440, and S450 need not be performed. In this case, it is clearly possible to choose one of multiple background colors beneath a whole black object and use that background color as the representative background color for the entire object in performing the steps S460 and following.

In step S460, the new composition of process black is determined according to the method of the invention based in part on the background color of the object or partial object currently being processed. Step S460 will be explained in further detail later.

Then, control flows to step S470 where, as previously described, the processed object or partial object is merged into the output page data in such a way that it will be printed in the correct location, with the correct shape, with the correct relation to other objects on the page, and with the correct color which has been calculated in previous step S460. After merging, it is determined in step S480 whether this is the last partial object of the partial object list which was generated in step S440. If this is the last partial object, or if the splitting steps S430–S450 were not performed but rather whole objects are being processed, then control flows to step S50, which was previously described. If this is not the last partial object in the list of partial objects generated in step S440, control returns to step S450, where the next partial object is fetched and processing on that partial object continues with steps S460 and following, as previously described.

Figure 11:
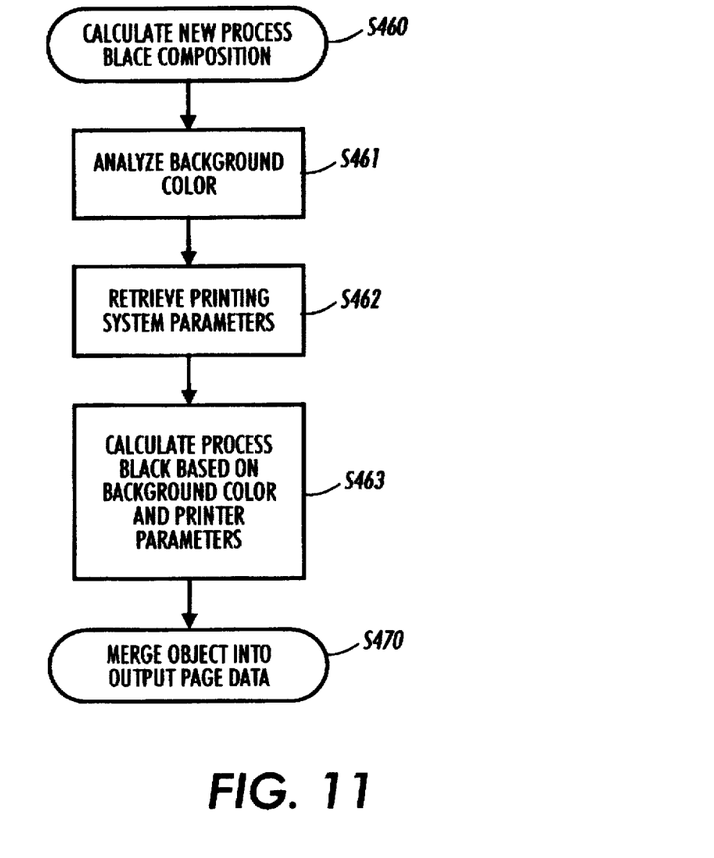
FIG. 11 shows the method by which a new process black composition is calculated based on the background color and printer parameters.

FIG. 11 shows in greater detail the step S460 of calculating the new composition of process black. In step S461, the background color or section thereof which was fetched in step S420 and possibly split into multiple sections by steps S430–S450 is analyzed to determine its characteristics. It is normally true that by the time an object is merged into the output page data in step S470, its color coordinates will have been converted to match the color separations of the output device, most generally CMYK (cyan, magenta, yellow, black). In this case, the background color as fetched from the output page data containing objects which have been previously processed for printing will generally have its color expressed in CMYK coordinates. Any number of algorithms can be used to calculate a process black that will print well in relation to the background color; the specific calculations used are highly printing system dependent. Most calculations needed, however, will be efficient in CMYK space. For example, the total pile height or colorant content of a background color is calculated as C+M+Y+K. Process colors not present in the background color will have values of 0. The maximum and minimum process colors contained in the background are also easily identified. Thus, while the specific data needed in analyzing the background color depends on the printing system being used, in most cases the CMYK color space will provide the most efficient color space for analysis. If, for certain output devices, the color is maintained in a different color space such as the L*a*b* or calibrated RGB color spaces additional system information would be likely be needed to complete analysis of the background color.

In step S462, relevent printer system parameters are retrieved as needed for the calculations matched to a specific printing system. For example, on some color xerographic systems, maximum pile height allowed can be an important parameter; beyond the maximum height a drop in quality occurs. Another parameter might be maximum allowable toner height difference between background and foreground colors, because in some systems a large difference can result in printing defects. Another parameter might be measured opacity of the black colorant, and another might be the order in which colorants are applied. Still another parameter might be the maximum allowed difference between process color values in the background and the foreground. For example, too much difference in value across a boundary can sometimes lead to trapping problems with misregistration. Some parameters might contain a set of values, depending on paper characteristics such as gloss and smoothness. Each system will have a different set of important parameters and different sets of values as well; the important parameters in relation to this invention can only be determined by a wide range of testing of various process blacks printed over a wide variety of background colors in a variety of object sizes, paper types and paper orientations. Once the parameters are empirically obtained, they are loaded into the system and retrieved in step S462.

In step S463, the analysis of the background color and the retrieved printing system parameters are combined to calculate a formulation of process black which will not violate the system parameters in relation to the current background color. The actual calculation is highly printer system dependent, just as are the relevent parameters and the background color analysis. In some systems, the calculation could be as simple as setting the process color values in the process black to the maximum of the process values in the background color and then reducing them uniformly to conform to the maximum allowed pile height. Other systems may average the CMY values of the background color and then reduce that value to match the maximum difference allowed in pile height. Each printing system is different; the specific calculations used must be derived experimentally and empirically to best suit each printing system.

Once the composition of the process black has been calculated, the current object being processed may be merged, in step S470, into the output page data so as to print in the correct location, with the correct shape, with the correct relation to other objects on the page, and with the corrected process black color. This merging step has been previously described.

While this invention has been described in conjunction with specific embodiments thereof, it is evident that many alternatives, modifications, and variations will be apparent to those skilled in the art. For example, this method of reducing the amount of colorant can be used in all types of color printers such as ink jet printers, laser printers and the like. Accordingly, the preferred embodiments of the invention as set forth herein are intended to be illustrative, not limiting. Various changes may be made without departing from the spirit and scope of the invention as defined in the following claims.

What is claimed is:

1. A method for forming from electronic signals and printing a process black object over two or more background areas of different colors, said method comprising the steps of:
   receiving data defining a page representation for said process black object and background areas,
   splitting the process black object into a plurality of partial process black objects, each partial process black object having a different background color from the other partial objects,
   for each partial object,
   a) reading said signals to determine a first amount of colorants to be used to print the background area,
   b) reading said signals to determine a second amount of colorants to be used to print said process black area
   c) computing a difference between the first and second amounts, and
   d) if the difference exceeds a predetermined limit, changing the amount of colorants to be used in said process black area to reduce the difference, and merging all partial objects in the page representation into an output data.

2. The method of claim 1 further comprising printing said output data.

3. A method according to claim 1 including storing said output data.

4. A method according to claim 1 including transmitting said output data to a visual output device.

5. A method according to claim 1 wherein said output data comprises a page description language.

6. A method according to claim 1 wherein said output data comprises a plurality of rasters, each raster encoding the values to be output at each point on the page for a color separation.

7. A method according to claim 6 wherein said color separation comprises one black and one non-black colorant.

8. A method according to claim 7 wherein said non-black colorant is cyan, magenta, or yellow.

9. A method according to claim 1 wherein said process black comprises two colorants.

10. In a system which uses electronic signals to specify black and non black colorants to be used to print a process black area over or adjacent to a background area, a method for determining an amount of colorants to be used to print said process black area comprising the steps of:
    reading said signals to determine a first amount of colorants to be used to print the background area,
    reading said signals to determine a second amount of colorants to be used to print said process black area,
    computing a difference between the first and second amounts, and
    if the difference exceeds a predetermined limit, changing the amount of colorants to be used in said process black area to reduce the difference.

11. The system of claim 10 wherein said changing step limits the amount of a non black colorant to a fraction, less than 1, of the average amount of the colorants in the background area.

12. The system of claim 10 additionally comprising the step of providing limits on any one or any combination of colorant amounts, and wherein the step of changing the amount of colorants to be used to print said process black area is additionally responsive to said colorant amount limits.

13. The system of claim 10 further comprising a limit on a difference between an amount of any one colorant to be used to print said background area and an amount of the same colorant to be used to print said process black area.

14. In a system which uses electronic signals to specify black and non black colorants to be used to print a process black pixel over or adjacent to a background pixel, a method for determining an amount of colorants to be used to print said process black pixel comprising the steps of:
    reading said signals to determine a first amount of colorants to be used to print the background pixel,
    reading said signals to determine a second amount of colorants to be used to print said process black pixel,
    computing a difference between the first and second amounts, and
    if the difference exceeds a predetermined limit, changing the amount of colorants to be used in said process black pixel to reduce the difference.

15. The system of claim 14 wherein said changing step limits the amount of a non black colorant to a fraction, less than 1, of the average amount of the colorants in the background pixel.

16. The system of claim 14 additionally comprising the step of providing limits on any one or any combination of colorant amounts, and wherein the step of changing the amount of colorants to be used to print said process black pixel is additionally responsive to said colorant amount limits.

17. The system of claim 14 further comprising a limit on a difference between an amount of any one colorant to be used to print said background pixel and an amount of the same colorant to be used to print said process black pixel.

18. The system of claim 14 including storing signals describing the amounts of colorants to be used.

19. The system of claim 14 including transmitting said signals describing the amounts of colorants to be used to a visual output device.

20. The system of claim 14 wherein said signals describing the amounts of colorants to be used are written in a page description language.

21. The system of claim 14 wherein said signals describing the amounts of colorants to be used are arranged into a plurality of rasters, each raster encoding the values to be output at each point on the page for each of a number of color separations.

22. The system of claim 21 wherein said color separations comprise one black and one non-black colorant separation.

23. The system of claim 22 wherein said one non-black colorant is cyan, magenta, or yellow.

24. The system of claim 14 wherein said process black comprises two colorants.

25. A system for producing and storing a modified page representation from electronic signals comprising an original page representation containing a process black color over or adjacent to a background color, the system comprising:

input means for inputting said electronic signals, data memory means for storing data representative of the modified page representation, computer means including program memory means for storing computer program instructions and processing means coupled to the input means, data memory means, and program memory means, for executing the stored program instructions, the processing means being responsive to input data comprising, (a) means for reading said signals to determine a first amount of colorants to be used to print the background color, (b) means for reading said signals to determine a second amount of colorants to be used to print said process black area, (c) means for computing a difference between the first and second amounts, (d) if the difference exceeds a predetermined limit, changing the amount of colorants to be used in said process black area to reduce the difference and thereby to modify said original page representation, and (e) means for storing said modified page representation into said data memory means.

26. A system for receiving electronic signals comprising an original page representation containing a process black color over or adjacent to a background color, and printing said page representation in modified form, the system comprising:

a printing device, input means for inputting said electronic signals, computer means including program memory means for storing computer program instructions and processing means coupled to the input means and program memory means for executing the stored program instructions, the processing means being responsive to input data, comprising (a) means for reading said signals to determine a first amount of colorants to be used to print the background color, (b) means for reading said signals to determine a second amount of colorants to be used to print said process black area, (c) means for computing a difference between the first and second amounts, (d) if the difference exceeds a predetermined limit, changing the amount of colorants to be used in said process black area to reduce the difference and thereby to modify said original page representation, and (e) means for transmitting said generated signals to the printing device, the printing device being responsive to the transmitted signals for printing the page representation in modified form.

* * * * *